(12) United States Patent
Mi

(10) Patent No.: US 6,885,357 B2
(45) Date of Patent: Apr. 26, 2005

(54) METHOD FOR WRITING PIXELS IN A CHOLESTERIC LIQUID CRYSTAL DISPLAY

(75) Inventor: Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 303 days.

(21) Appl. No.: 10/334,571

(22) Filed: Dec. 31, 2002

(65) Prior Publication Data

US 2004/0125056 A1 Jul. 1, 2004

(51) Int. Cl.[7] .................................................. G09G 3/18
(52) U.S. Cl. ........................... 345/94; 345/95; 345/208; 345/89; 349/35; 349/169
(58) Field of Search ................... 345/87–103, 208–210; 349/33–35, 168–177

(56) References Cited

U.S. PATENT DOCUMENTS

| | | | |
|---|---|---|---|
| 4,435,047 A | 3/1984 | Fergason | |
| 5,251,048 A | 10/1993 | Doane et al. | |
| 5,437,811 A | 8/1995 | Doane et al. | |
| 5,503,952 A | 4/1996 | Suzuki et al. | |
| 5,644,330 A | 7/1997 | Catchpole et al. | |
| 5,661,533 A | 8/1997 | Wu et al. | |
| 5,695,682 A | 12/1997 | Doane et al. | |
| 5,748,277 A | 5/1998 | Huang et al. | |
| 5,933,203 A | * 8/1999 | Wu et al. | ...................... 349/35 |
| 6,133,895 A | 10/2000 | Huang | |
| 6,154,190 A | 11/2000 | Yang et al. | |
| 6,204,835 B1 | 3/2001 | Yang et al. | |
| 6,268,839 B1 | 7/2001 | Yang et al. | |
| 6,268,840 B1 | 7/2001 | Huang | |
| 6,414,669 B1 | * 7/2002 | Masazumi | ...................... 345/98 |
| 2001/0015723 A1 | 8/2001 | Kwok et al. | |

OTHER PUBLICATIONS

V. Sorokin, "Simple Driving Methods for Cholesteric Reflective LCDs," *Asia Display 98*, pp. 749–752.
Hashimoto et al., "Reflective Color Display Using Cholesteric Liquid Crystals," *SID 98 Digest*, pp. 897–900.
U.S. Appl. No. 09/723,389, filed Nov. 28, 2000 by Johnson et al.
U.S. Appl. No. 09/851,868, filed May 9, 2001 by Stephenson et al.
U.S. Appl. No. 09/923,659, filed Aug. 7, 2001 by Mi et al.

* cited by examiner

*Primary Examiner*—Lun-yi Lao
(74) *Attorney, Agent, or Firm*—Kathleen Neuner Manne

(57) ABSTRACT

A method for writing pixels in a cholesteric liquid crystal display having opposing rows and columns of electrodes and cholesteric liquid crystal material disposed between the rows and columns of electrodes to define an array of pixels, the cholesteric liquid crystals having a plurality of reflective states stable in the absence of an electrical field, one state having a minimum reflection, and another state with maximum reflection includes the steps of: applying voltages to the row an column electrodes to establish a pre-selection pixel voltage having a magnitude and duration effective to change at least one possible reflective state, but ineffective to drive the liquid crystal material to a common state; applying voltages to the row and column electrodes to establish a selection pixel voltage for selecting a final reflective state for the pixel; and applying voltages to the row and column electrodes to establish a post selection pixel voltage for achieving a final desired reflective state.

52 Claims, 12 Drawing Sheets

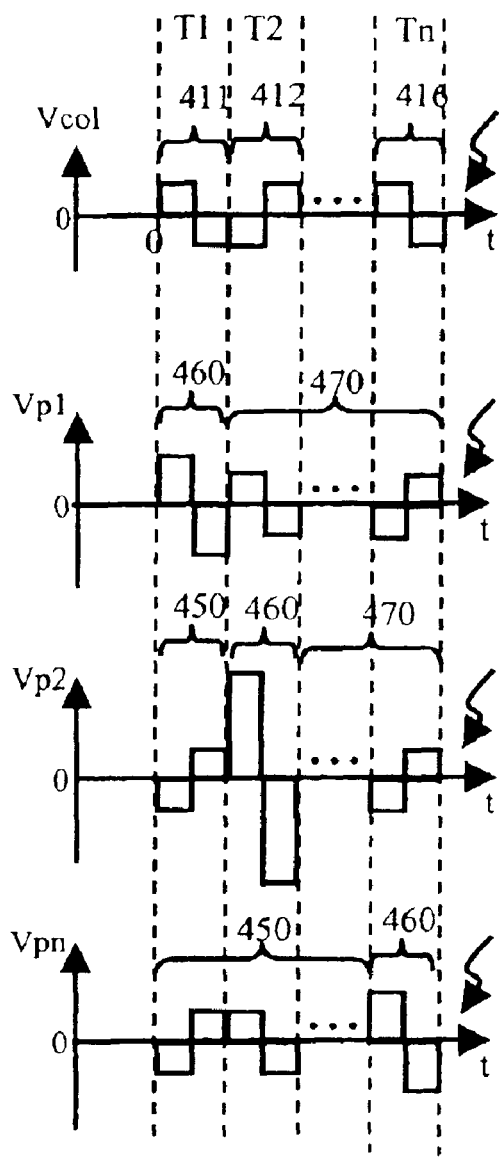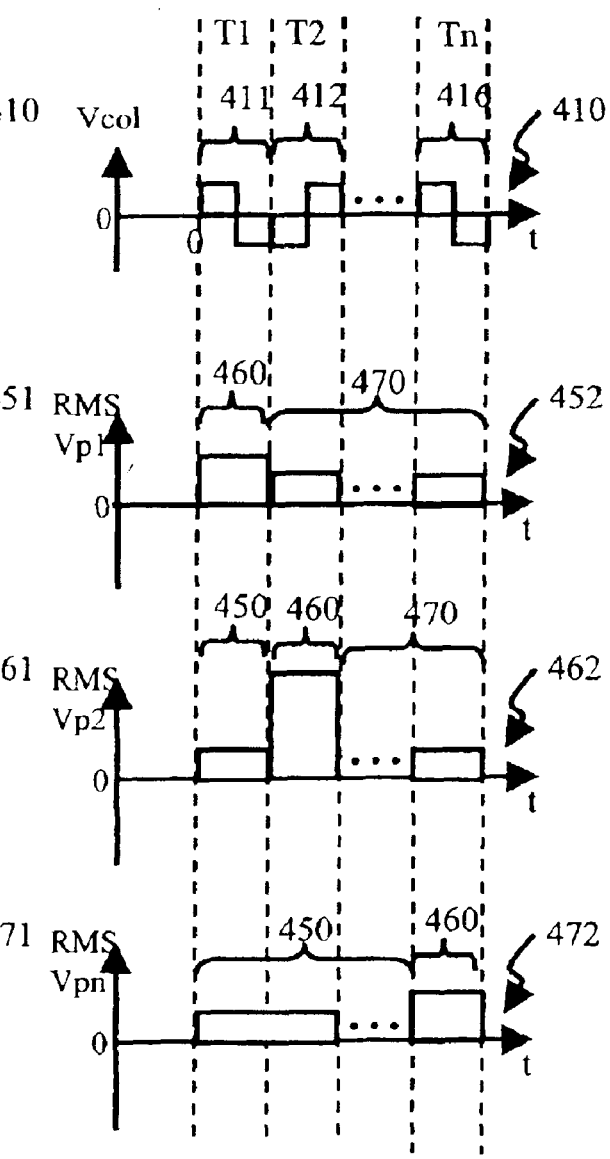
FIG. 3B
(PRIOR ART)
FIG. 3C
(PRIOR ART)

METHOD FOR WRITING PIXELS IN A CHOLESTERIC LIQUID CRYSTAL DISPLAY

FIELD OF THE INVENTION

The present invention relates to cholesteric (chiral nematic) liquid crystal displays and their electrical drive schemes, which provide high-speed writing of the display at a low cost.

BACKGROUND OF THE INVENTION

Flat panel LCDs use two transparent glass plates as substrates. In a typical embodiment, such as one set forth in U.S. Pat. No. 5,503,952 issued Apr. 2, 1996 to Suzuki et al., a set of electrical traces is sputtered in a pattern of parallel lines that form a first set of conductive traces. A second substrate is similarly coated with a set of traces having a transparent conductive coating. Coatings are applied and the surfaces rubbed to orient liquid crystals. The two substrates are spaced apart and the space between the two substrates is filled with a liquid crystal material. Pairs of conductors from either set are selected and energized to alter the optical transmission properties of the liquid crystal material. Such displays are expensive.

Fabrication of flexible, electronically written display sheets using conventional nematic liquid crystals materials is disclosed in U.S. Pat. No. 4,435,047 issued Mar. 6, 1984 to Fergason. A first sheet has transparent indium-tin-oxide (ITO) conductive areas and a second sheet has electrically conductive inks printed on display areas. The sheets can be thin glass, but in practice have been formed of polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Privacy windows are created from such materials using the scattering properties of conventional nematic liquid crystals. Nematic liquid crystals require continuous electrical drive to remain transparent.

U.S. Pat. No. 5,437,811 issued Aug. 1, 1995 to Doane et al. discloses a light-modulating cell having a chiral nematic liquid crystal (cholesteric liquid crystal) in polymeric domains contained by conventional patterned glass substrates. The chiral nematic liquid crystal has the property of being driven between a planar state reflecting a specific visible wavelength of light and a light scattering focal conic state. Chiral nematic material has two stable slates and can maintain one of the stable states in the absence of an electric field. Consequently, chiral nematic displays have no limit on the number of lines that can be addressed. U.S. Pat. No. 5,251,048 issued Oct. 5, 1993 to Doane et al., and U.S. Pat. No. 5,644,330 issued Jul. 1, 1997 to Catchpole et al. disclose various driving methods to switch chiral nematic materials between its stable states. However, the update rate of these displays is far too slow for most practical applications. Typically, the update rate was about 10–40 milliseconds per line. It would take a 10–40 seconds to update a 1000 line display.

U.S. Pat. No. 5,748,277 issued May 5, 1998 to Huang et al., and U.S. Pat. No. 6,154,190 issued Nov. 28, 2000 to Yang et al. disclose fast driving schemes for chiral nematic displays, which are called dynamic driving schemes. The dynamic driving schemes generally comprise a preparation step, a selection step, and an evolution step. The voltage amplitude and the duration of the preparation step need to be sufficient to cause the complete transformation of the material to the homeotropic texture. U.S. Pat. No. 6,154,190 also discloses a two-phase drive scheme having a preparation step and a selection step. According to this patent, a preparation voltage is applied for a sufficient duration to obtain the focal conic texture.

U.S. Pat. No. 5,661,533 issued Aug. 26, 1997 to Wu et al. discloses a drive method comprising an initialization step and an addressing step. During the initialization step, the liquid crystal material is initialized into a homeotropic (called a nematic phase in the '533 patent) texture, and subsequently driven to a focal conic texture. This focal conic state then serves as a known reference for subsequent driving. It is suggested that this unique process of initialization of the focal conic state makes the switching of material from the focal conic state to the planar state faster than directly writing the material to the focal conic state with a single step. A similar idea has been proposed in a paper (Hashimoto et al. "Reflective Color display using cholesteric liquid crystals", SID Digest 1998, pp.897–900). According to this paper, all pixels are first set into the focal conic state simultaneously, then each pixel is selectively driven to the planar state or remain in the focal conic state. Other similar ideas can be found in "Simple driving methods for cholesteric reflective LCDs" by Sorokin in Asia Display 1998, pp.749–752, which suggests to switch all pixels into the transient focal conic homeotropic state by the effective voltage $U/\sqrt{3}$ in the preparation phase. U.S. Pat. No. 6,268,839 issued Jul. 31, 2001 to Yang et al., also proposes a drive method which initializes the liquid crystal to the focal conic or the planar state as a common state for subsequent driving.

U.S. patent application No. 2001/0015723 by Kwok et al., published Aug. 23, 2001, discloses a method in which all the pixels are initially driven to the planar state, and selected pixels are then driven to the focal conic state.

All of the above drive schemes for cholesteric liquid crystal displays fall into two categories. The first catagory is directly writing pixels to a final state independent of initial states such as the ones disclosed in U.S. Pat. Nos. 5,251,048 and 5,644,330, both referenced above. Drive schemes in this first category are slow. They may be made to appear faster by dividing the long drive pulse into a series of short pulses as disclosed in U.S. Pat. No. 6,133,895 issued Oct. 17, 2000 to Huang, and U.S. Pat. No. 6,204,835 issued Mar. 20, 2001 to Yang et al. However, the total drive time for each row is still long. The second category of drive schemes first write all pixels into a common state, then selectively write pixels to different final states. This common state can be a homeotropic state (texture), a focal conic state (texture), a planar state, a transient focal conic homeotropic state, or any gray level state between the focal conic and the planar states. This second category of drive schemes using a common state prior to selection of a final state is conceptually simple. Once all pixels are in a common state, it is easy to subsequently drive pixels into a desired final state.

However, the second category of drive schemes based on driving the pixels to a common state has problems. First, these drive schemes require a substantially long initialization time to prepare the common state. Second, for some of these drive schemes, such as the three phase and five phase dynamic drive schemes described in U.S. Pat. Nos. 5,748,277 and 6,154,190, referenced above, driving all of the pixels to a common homeotropic state can result in the unpleasant appearance of a black bar that sweeps across the image as the display is written. There is a need therefore for an improved fast drive scheme that avoids the problems noted above.

SUMMARY OF THE INVENTION

The need is met according to the present invention by providing a method for writing pixels in a cholesteric liquid crystal display having opposing rows and columns of electrodes and cholesteric liquid crystal material disposed between the rows and columns of electrodes to define an array of pixels, the cholesteric liquid crystals having a plurality of reflective states stable in the absence of an electrical field, one state having a minimum reflection, and another state with maximum reflection that includes the steps of: applying voltages to the row and column electrodes to establish a pre-selection pixel voltage having a magnitude and duration effective to change at least one possible reflective state, but ineffective to drive the liquid crystal material to a common state; applying voltages to the row and column electrodes to establish a selection pixel voltage for selecting a final reflective state for the pixel; and applying voltages to the row and column electrodes to establish a post selection pixel voltage for achieving a final desired reflective state.

ADVANTAGES

The invention has the advantage of reducing the pre-selection time and in one embodiment can eliminate the appearance of black bar that sweeps across the image as the display is written.

BRIEF DESCRIPTION OF THE DRAWINGS

FIG. 3B shows a prior art pixel voltage waveforms resulting from the column and row voltage waveforms of FIG. 3A;

FIG. 3C shows RMS pixel voltage waveforms resulting from the pixel voltage waveforms of FIG. 3B;

DETAILED DESCRIPTION OF THE INVENTION

Figure 1:
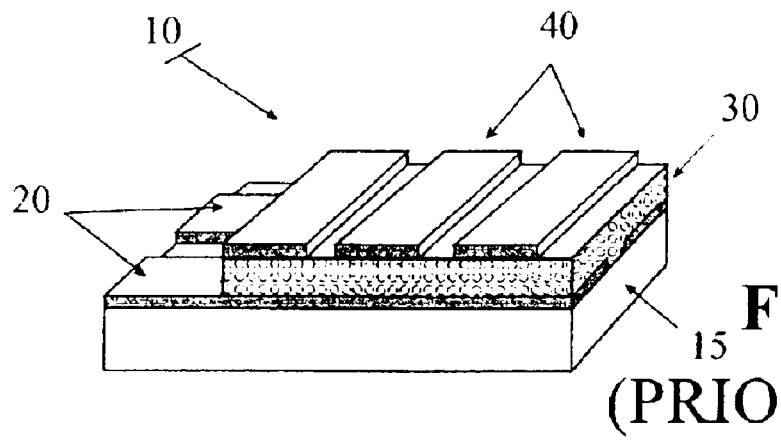
FIG. 1 is a partial perspecive view of a prior art cholesteric liquid crystal display.

FIG. 1 is partial perspective view of a structure for a prior art display 10 that can be driven in accordance with the invention. Display 10 includes a flexible substrate 15, which is a thin transparent polymeric material, such as Kodak Estar™ film base formed of polyester plastic that has a thickness of between 20 and 200 microns. In an exemplary embodiment, substrate 15 can be a 125 micron thick sheet of polyester film base. Other polymers, such as transparent polycarbonate, can also be used.

Electrodes in the form of first patterned conductors 20 are formed over substrate 15. First patterned conductors 20 can be tin-oxide or indium-tin-oxide (ITO), with ITO being the preferred material. Typically, the material of first patterned conductors 20 is sputtered as a layer over substrate 15 having a resistance of less than 250 ohms per square. The layer is then patterned to form first patterned conductors 20 in any well known manner. Alternatively, first patterned conductors 20 can be an opaque electrical conductor material such as copper, aluminum, or nickel. If first patterned conductors 20 are opaque metal, the metal can be oxidized to create light absorbing first patterned conductors 20. First patterned conductors 20 are formed in the conductive layer by conventional photolithographic or laser etching means.

A light modulating material such as a polymer dispersed cholesteric layer 30 overlays first patterned conductors 20. In a preferred embodiment, the polymer dispersed cholesteric layer 30 includes a polymeric host material and dispersed cholesteric liquid crystal materials, such as those disclosed in U.S. Pat. No. 5,695,682 issued Dec. 9, 1997 to Doane et al., the disclosure of which is incorporated by reference. Application of electrical fields of various amplitude and duration can drive a chiral nematic material into a reflective state, a transmissive state, or an intermediate state. These cholesteric materials have the advantage of maintaining a given state indefinitely after the field is removed. Cholesteric liquid crystal materials can be Merck BL112, BL118 or BL126, available from E.M. Industries of Hawthorne, N.Y.

In the preferred embodiment, the polymeric host material is provided by E.M. Industries cholesteric material BL-118 dispersed in deionized photographic gelatin. The liquid crystal material is dispersed at 8% concentration in a 5% deionized gelatin aqueous solution. The mixture is dispersed to create 10 micron diameter domains of the liquid crystal in aqueous suspension. The material is coated over a patterned ITO polyester sheet to provide a 7 micron thick polymer dispersed cholesteric coating. Other organic binders such as polyvinyl alcohol (PVA) or polyethylene oxide (PEO) can be used. Such compounds are machine coatable on equipment associated with photographic films.

Electrodes in the form of second patterned conductors 40 overlay polymer dispersed cholesteric layer 30. Second patterned conductors 40 should have sufficient conductivity to establish an electric field across polymer dispersed cholesteric layer 30. Second patterned conductors 40 can be formed in a vacuum environment using materials such as aluminum, silver, platinum, carbon, tungsten, molybdenum, tin, or indium or combinations thereof. The second patterned conductors 40 are as shown in the form of a deposited layer. Oxides of the metals can be used to darken second patterned conductors 40. The metal material can be oxidized by applying energy from resistance heating, cathodic arc, electron beam, sputtering, or magnetron excitation. Tin-oxide or indium-tin-oxide coatings permit second patterned conductors 40 to be transparent. Electrodes 20 and 40 are on opposite sides of the layer 30 and are in rows and columns, respectively, so that the intersection of a row and column defines pixels for applying an electric field at each intersection across the layer 30 when a voltage is applied to the electrodes.

In the preferred embodiment, second patterned conductors 40 are printed conductive ink such as Electrodag 423SS screen printable electrical conductive material from Acheson Corporation. Such printed materials are finely divided graphite particles in a thermoplastic resin. The second patterned conductors 40 are formed using the printed inks to reduce display cost. The use of a flexible support for substrate 15, laser etching to form first patterned conductors 20, machine coating polymer dispersed cholesteric layer 30 and printing second patterned conductors 40 permits the fabrication of very low cost memory displays. Small displays formed using these methods can be used as electronically rewritable tags for inexpensive, limited rewrite applications.

Figure 2A:
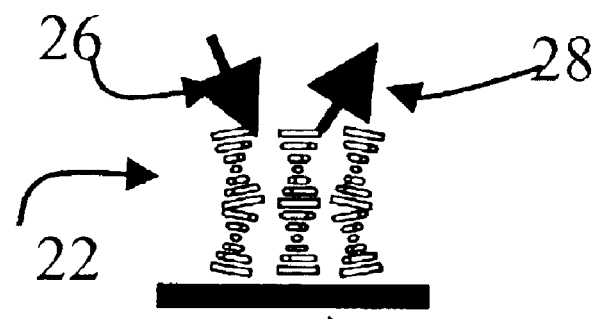
FIG. 2A is a schematic diagram of a prior art cholesteric liquid crystal material in a planar state reflecting light.
Figure 2B:
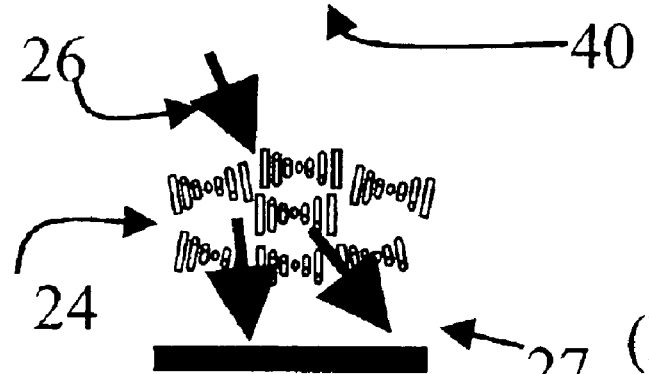
FIG. 2B is a schematic diagram of a prior art cholesteric liquid crystal material in a focal conic state forward scattering light.
Figure 2C:
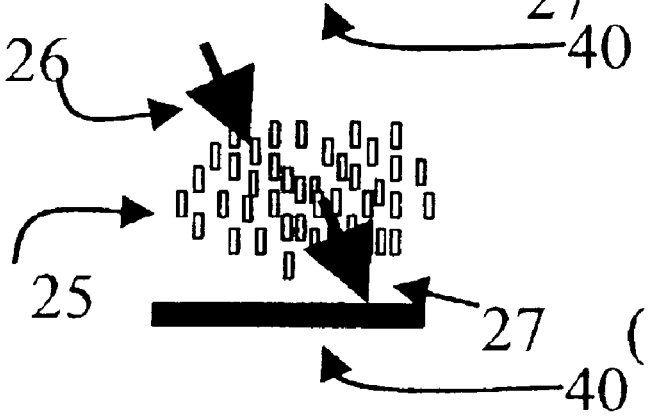
FIG. 2C is a schematic diagram of a prior art cholesteric liquid crystal material in a homeotropic state transmitting light.

FIGS. 2A and 2B show two stable states of cholesteric liquid crystals. In FIG. 2A, a high voltage field has been applied and quickly switched to zero potential, which converts cholesteric liquid crystal to a planar state 22. Incident light 26 with proper wavelength and polarization striking cholesteric liquid crystal in planar state 22 is reflected as reflected light 28 to create a bright image. In FIG. 2B, application of a lower voltage field leaves cholesteric liquid crystal in a transparent focal conic state 24. Incident light 26 striking a cholesteric liquid crystal in focal conic state 24 is mainly forward scattered. Second patterned conductors 40 can be black which absorbs transmitted light 27 to create a dark image when the liquid crystal material is in focal conic state 24. As a result, a viewer perceives a bright or dark image depending if the cholesteric material is in planar state 22 or focal conic state 24, respectively. The cholesteric liquid crystal material also has a plurality of reflective states when a part of the cholesteric material is in planar state 22 and the rest is in focal conic state 24. Consequently, a viewer also perceives gray level images. In FIG. 2C, cholesteric liquid crystal is in a homeotropic state 25 when a high voltage is applied. Incident light 26 illuminating a cholesteric liquid crystal in homeotropic state 25 is transmitted.

Figure 2D:
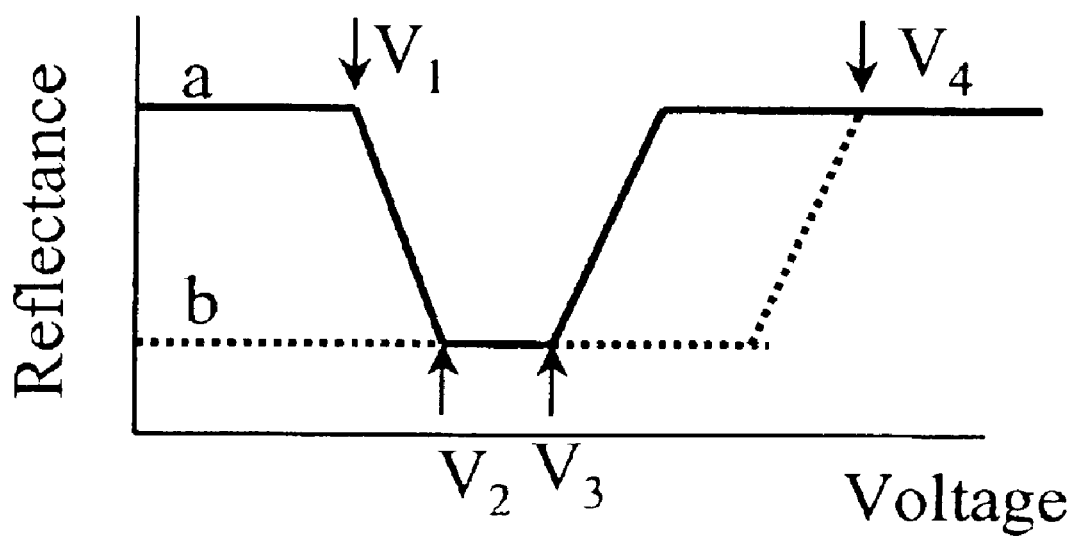
FIG. 2D is a plot of the typical response of reflectance of a prior art cholesteric liquid crystal material to a pulsed voltage.

FIG. 2D illustrates the state of the liquid crystal material after the application of various driving voltages thereto. This figure generally corresponds to FIG. 1 of U.S. Pat. No. 5,644,330, referenced above. The liquid crystal material in layer 30 begins in a first state, either the reflecting planar state 22 shown in FIG. 2A or the non-reflecting focal conic state 24 shown in FIG. 2B, and is driven with an AC voltage, having an RMS (root mean square) amplitude above V4 in FIG. 2D. When the voltage is removed quickly, the liquid crystal material switches to the reflecting state and will remain reflecting. If driven with an AC voltage between V2 and V3, the material will switch into the non-reflecting state and remain so until the application of a second driving voltage. If no voltage is applied, or the voltage is well below V1, then the material will not change state, regardless of the initial state.

Figure 3A:
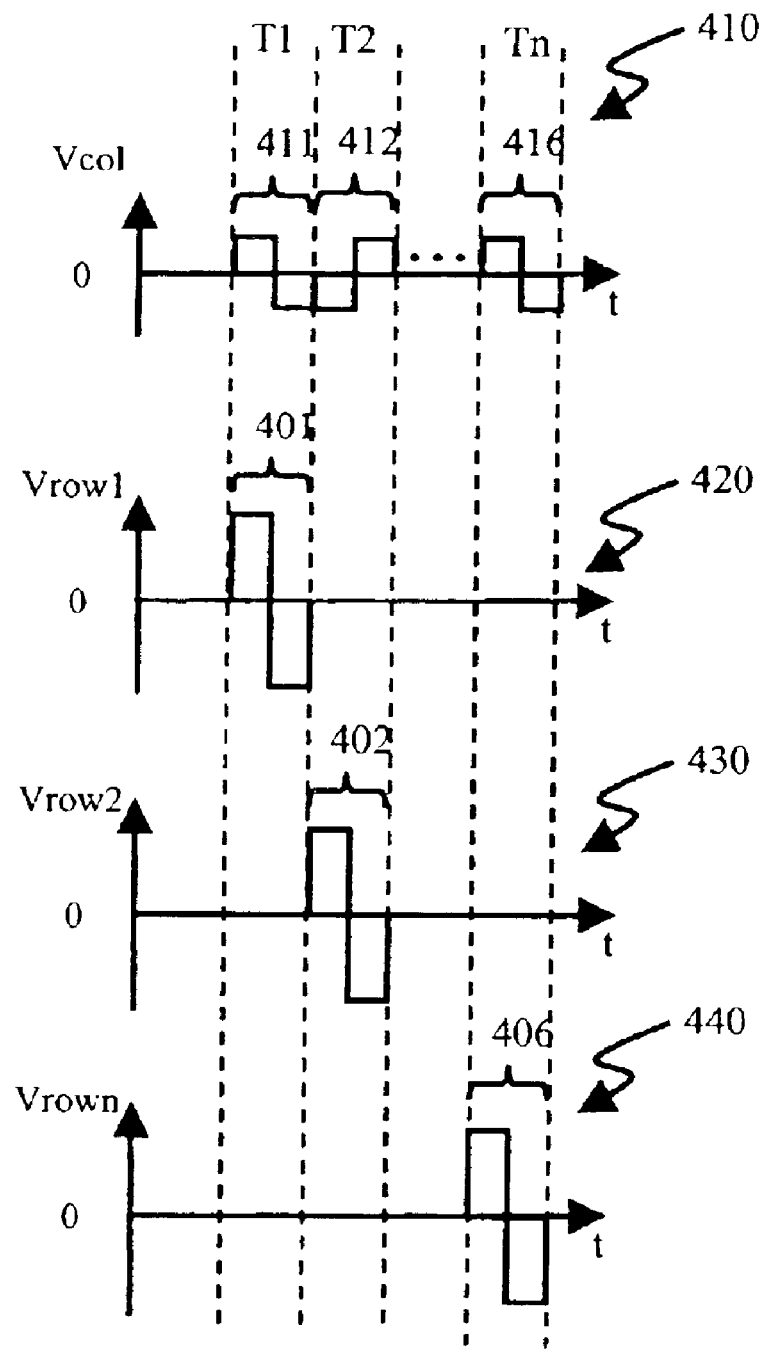
FIG. 3A shows column and row voltage waveforms according to a prior art conventional drive scheme.

FIGS. 3A, 3B and 3C describe a conventional drive scheme as disclosed in U.S. Pat. Nos. 5,251,048 and 5,644,330, referenced above, which directly writes pixels into a final state regardless of their initial states. When a row is selected to be written, a voltage Vsrow=½(V3+V4) is applied to the selected row. When the row is not selected, zero voltage is applied. The voltage applied to a column Vcol represents the data, which is either −½(V4−V3), or ½(V4−V3). Without loss of generality, FIG. 3A shows a column voltage waveform Vcol 410 applied to a column electrode, and three row voltage waveforms Vrow1 420, Vrow2 430, and Vrowf 440, applied to the first row, the second row, and the last row electrodes, respectively.

In the first period T1 of a writing, the first row is selected. Voltage pulse 401 is applied to the first row electrode, and zero voltage is applied to all other row electrodes. In the meantime, voltage pulse 411 is applied to the column electrode. In the second period T2 of the writing, the second row is selected. The row voltage pulse 402 is applied to the second row and zero voltage is applied to all other rows, and the voltage pulse 412 is applied to the column electrode. In the last period Tn of the writing, the last row is selected. The last row receives voltage pulse 406 and all other rows are set to zero, and voltage pulse 416 is applied to the column electrode. The voltage pulses 401, 402, and 406 are all equal to, for example, Vsrow=½(V3+V4). The column voltage pulses 411, 412, and 416 are either −½(V4−V3), or ½(V4−V3). Other choices of Vsrow and Vcol are possible. For example, when Vsrow is chosen to be V3, Vcol needs to be either 0, or −V4−V3).

The voltage across pixels (i.e. the difference between the corresponding row voltage and column voltage) shall be referred as a pixel voltage. In FIG. 3B, pixel voltage waveforms Vp1 451, Vp2 461, and Vpn 471 are formed between the column voltage waveform 410, and row voltage waveforms 420, 430, 440 from the first row, the second row, and the last row, respectively. For the pixel on the first row, it is selected in the period T1. During the selection step 460 the pixel voltage pulse of waveform Vp1 451 has a lower amplitude than the voltage pulse 401 because the row voltage pulse 401 and the column voltage pulse 411 are in phase. After the selection step 460, the pixel voltage waveform 451 on the first row is still applied to the column, which is represented by the voltage pulse applied in the post-selection step 470. Similarly, for the pixel on the last row, during the period Tn the pixel voltage pulse of waveform Vpn 471 is in the selection step 460. Prior to the selection step 460, the pixel voltage waveform 471 on the last row has a pre-selection step 450 due to the column voltage applied in the periods prior to Tn. The pixel on the second row is selected in the period T2. The pixel voltage waveform Vp2 461 has a selection step 460, in which the voltage pulse has a higher amplitude since the voltage pulses 402 and 412 are out of phase. The pixel voltage waveform Vp2 461 on the second row (which is representative of the pixel voltage on all other rows except the first and the last rows) includes a voltage pulse in a pre-selection step 450 prior to the selection step 460, and a voltage pulse in the post-selection step 470 following the selection step 460.

Referring to FIG. 3C, pixel voltage waveforms 452, 462, and 472 show RMS (root mean square) voltage waveforms of the pixel voltage waveforms 451, 461, and 471, respectively. In general a waveform such as 462 has a selection step 460, which determines the final state of the liquid crystal, a pre-selection step 450 prior to the selection step 460, and a post-selection step 470 following the selection step 450. For the last row, the pixel voltage waveform 472 has only a pre-selection step 450 and a selection step 460. For the first row, the pixel voltage waveform 452 has only a selection step 460 and a post-selection step 470. However, the prior art conventional drive schemes require column voltage Vcol to be small, preferably smaller than V1 as shown in FIG. 2D, so that the pulse voltages in the pre-selection step 450 and in the post-selection 470 do not switch the state of the liquid crystal. Since the pulse voltages in the pre-selection step 450 and in the post-selection 470 do not have any effect in the conventional drive schemes, they are essentially wasted.

The three steps of pre-selection step, selection step, and post-selection step appear in all other prior art driving schemes for driving a display, including but not limited to a liquid crystal display, using a passive matrix method. However, unlike in the conventional drive scheme, in many prior art driving schemes, during the pre-selection step (called by different names such as the preparation step, the reset step, or the initialization step), the pixel voltage is sufficient to write the pixel from any initial state into a common state as mentioned above in the background. In drive schemes that drive the liquid crystal material to a common state, the overall speed of the drive scheme is limited by the time required to drive the material to a common state.

The present invention is directed to a method wherein the pre-selection step and post-selection step in a passive matrix drive method are employed to eliminate the need for driving the liquid crystal material to a common state, thereby reducing the overall time required to drive a pixel to a given final state and improving the overall speed of the drive scheme.

Figure 4A:
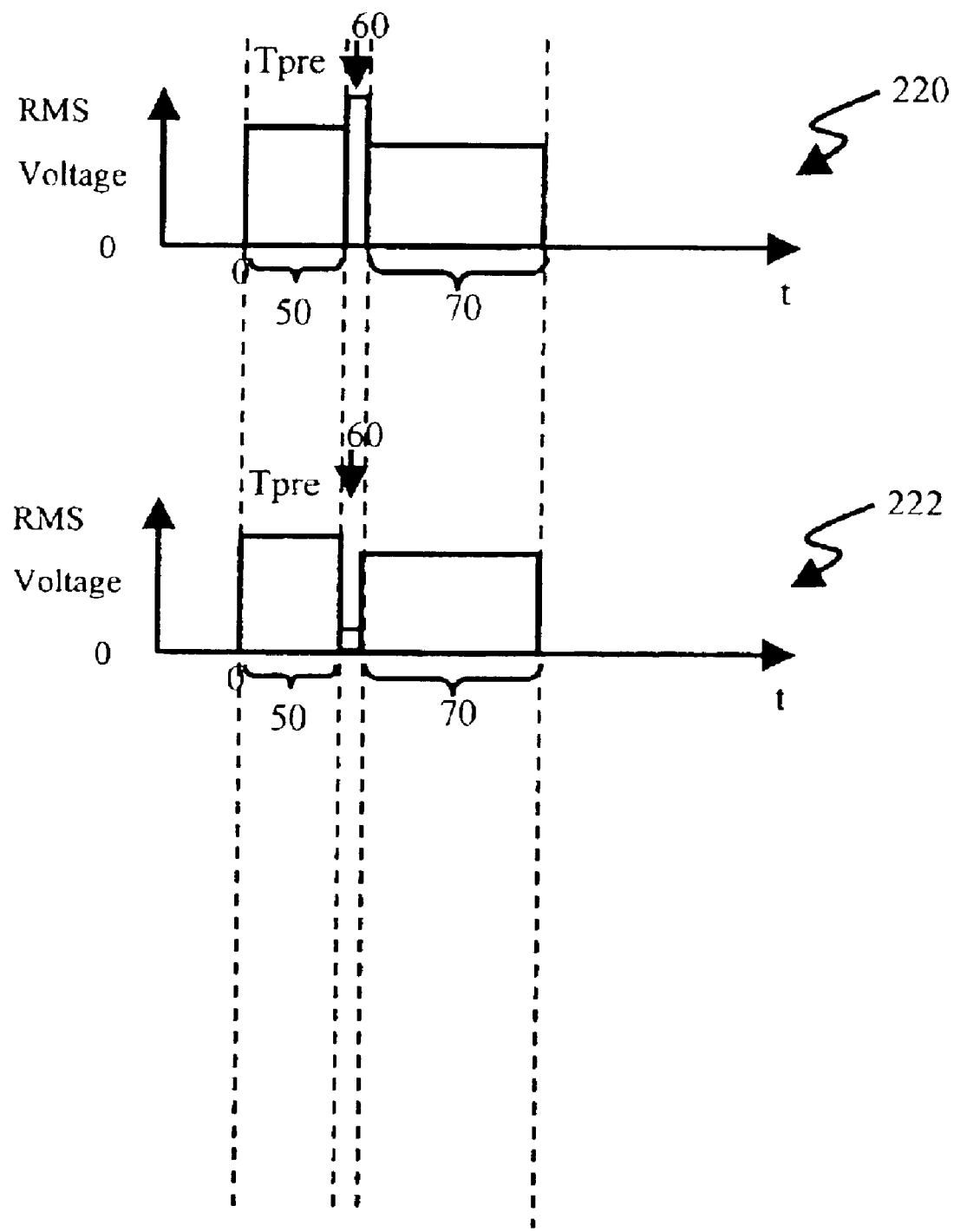
FIG. 4A is a schematic diagram of RMS pixel voltage waveforms resulting from a drive scheme in accordance with the present invention.

FIG. 4A shows RMS pixel voltage waveforms 220, 222 comprising a pre-selection step 50, a selection step 60, and a post-selection step 70 according to the present invention. In the pre-selection step 50, voltages are applied to the row and column electrodes to establish a pre-selection pixel voltage having a magnitude Vpre and duration Tpre effective to change at least one possible reflective state, but ineffective to drive the liquid crystal material to a common state. In the selection step 60, voltages are applied to the row and column electrodes to establish a selection pixel voltage for selecting a final reflective state for the pixel. In the post-selection step 70, voltages are applied to the row and column electrodes to establish a post selection pixel voltage for achieving a final desired reflective state. Waveforms 220 and 222 have different RMS pixel voltage amplitudes in the selection step 60, corresponding to different final states.

The unique characteristic of this drive scheme is that the pre-selection pixel voltage has a magnitude and duration effective to change at least one possible reflective state, but ineffective to drive the cholesteric liquid crystal material to a common state. The cholesteric liquid crystals have a plurality of reflective states stable in the absence of an electrical field, one state having a minimum reflection, and another state with maximum reflection. The possible reflective state can be a planar state, or a focal conic state, or any combination state of the planar and focal conic states having a reflection between the maximum reflection and the minimum reflection. The pre-selection step 50 in accordance with the present invention has a different function compared to that of the prior art. Unlike the conventional drive scheme, the pre-selection step 50 changes at least one of the possible initial states and contributes to the switching of the liquid crystal material from one state to another. However, the pre-selection step 50 does not prepare pixels into a common state as in the prior art dynamic drive schemes, instead, it represents just a portion of the total combined pixel voltage waveform 220, 222 comprising a pre-selection step 50, a selection step 60, and a post-selection step 70. Advantageously, not driving the liquid crystal into a common state allows reduction of the pre-selection time. By properly choosing driving parameters such as amplitude, frequency, and duration of a pixel voltage waveform, total frame time can be minimized as well.

Figure 4B:
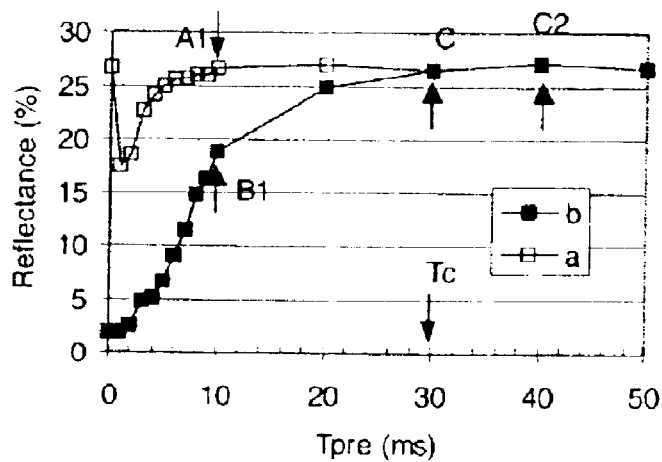
FIG. 4B is a graph showing comparative results of the pre-selection time dependence of the reflectance for planar and focal conic initial states using a relatively high pre-selection voltage.

FIG. 4B shows comparative results of the pre-selection time Tpre dependence of the reflectance for different initial states at a relatively high pre-selection voltage. Curve a (empty squares) represents results for an A type of pixel, which is originally in a planar state. Curve b (filled squares) represents results for a B type of pixel, which is originally in a focal conic state. In this particular experiment, the pre-selection voltage is 120 volts. Like Curves a and b shown in FIG. 2D, the reflectance is measured at one second or longer after the voltage pulse is over. It can be seen that when the pulse duration or width Tpre is short, the pixel ends in different states depending on where it starts initially. For example, with a pulse width of 10 ms, an A type of pixel hits point A1, and a B type of pixel ends at point B1. Points A1 and B1 represent reflective states having very different reflection. When the pulse width Tpre is set at a critical value Tc, both A type of pixel and B type of pixel are switched to point C, which is a common state. In this particular case, the pixel is in a homeotropic state right after the pre-selection step 50, and will relax to a planar state after the voltage is removed. Also, when the pulse width is sufficiently long, a longer pulse will not make any difference in the reflection of the final states. For example, point C and point C2 have essentially the same reflection (~27%) although the corresponding pulse widths are very different (30 ms for point C, and 40 ms for point C2). These results indicate that when the pre-selection time Tpre is sufficiently long, the pixels are completely switched into a homeotropic state independent of their initial states. On the contrary, when the pre-selection time Tpre is shorter than a critical value Tc, the final state varies with pulse width, as well as the initial state. Without wanting to be bound by theory, this suggests that in the zone where Tpre is smaller than the critical value Tc, at the end of the pre-selection step, the liquid crystal material is left in a dynamic process. The dynamic process can be an evolution from a planar state to a focal conic state, or to a homeotropic state, or from a focal conic state to a homeotropic state, or to a planar state, or anywhere from one state to another state. The pre-selection step according to the invention has a duration Tpre, which is below the critical value Tc.

Figure 4C:
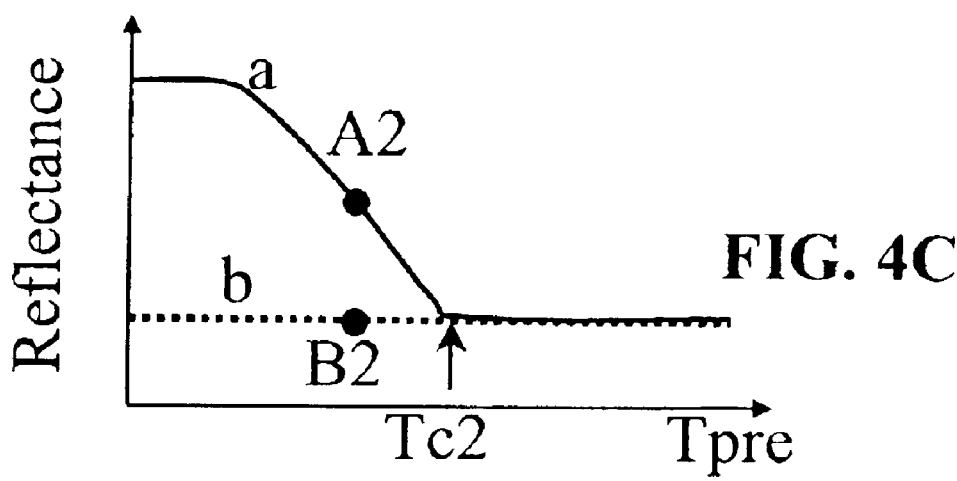
FIG. 4C is a graph showing comparative results of the pre-selection time dependence of the reflectance for planar and focal conic initial states using a relatively low pre-selection voltage.

Another example for the pre-selection step is illustrated in FIG. 4C for a relatively low pre-selection voltage, in which the common state is a focal conic state when the pulse duration Tpre is longer than a critical value Tc2. Similarly, Curves a (for an A type of pixel) and b (for a B type of pixel) represent pixels initially in the planar or focal conic states, respectively. When Tpre is less than Tc, the A type of pixel ends at point A2, and the B type pixel stays at point B2. Pixels at point A2 and point B2 have different reflections, and therefore the liquid crystals are not switched into a common state as they are by a conventional preparation step.

Figure 4D:
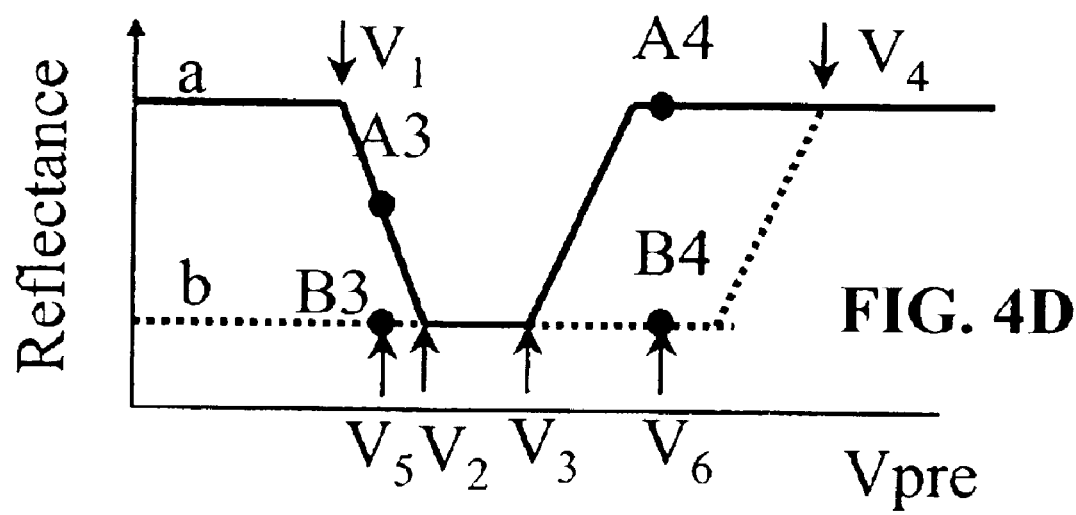
FIG. 4D is a graph showing comparative results of the pre-selection voltage dependence of the reflectance for planar and focal conic initial states.

The third example for the pre-selection step is illustrated referring to FIG. 4D, which is the same as FIG. 2D except V5 and V6 are marked for Points A3, B3, A4, and B4. When the pre-selection time Tpre is fixed, the RMS voltage amplitude of the pre-selection voltage Vpre can be tuned to set the pixels into different states. For example, by applying a voltage with amplitude V5, the A type of pixel is switched to Point A3, and the B type of pixel is switched to Point B3, indicating that one of the possible state remains unchanged, while the other state changes. Similarly, if the applied voltage has an RMS amplitude of V6, both A and B types of pixels are switched to different states represented by Point A4 and B4, respectively.

Those who are skilled in the art will appreciate that there are a variety of ways to implement the pre-selection step within the scope of the current invent. In any case, after the pre-selection, the A type of pixel and B type of pixel are in different states. Most likely they are in a dynamic process, namely the liquid crystal texture is changing during the pre-selection step, and no stable state is reached under the pre-selection step.

FIGS. 4B and 4C show at least one advantage that the duration of the pre-selection step is shorter than the preparation step used in the prior art.

Despite a lack of a common state immediately after the pre-selection step, it is surprising that with the shorter pre-selection step of the present invention, combined with a selection step, and a post-selection step, a cholesteric liquid crystal display can be reliably switched between two optically distinctive states at a speed of less than 1 ms per row.

In the following, several embodiments are given to illustrate the drive scheme in accordance with the present invention. Referring to FIG. 5C, there are shown three RMS pixel voltage waveforms 252, 262, 272, representing voltage waveforms on the first row, the second row, and the last row. All waveforms have a pre-common step 55 in the pre-selection step 50. In the pre-common step 55, a pre-common voltage Vpre-c is applied to all rows simultaneously. The pre-selection step 50 further comprises a holding step 65 between the pre-common step 55 and the selection step 60. However, this holding step 65 increases its duration from 0 on the first row waveform 252 to a maximum duration on the last row waveform 272. All waveforms 252, 262, 272 also have a post-common step 80 in the post-selection step 70. In the post-common step 80, a post-common voltage Vpost-c is applied to all rows simultaneously. The post-selection step 70 further comprises a holding step 75 between the post-common step 80 and the selection step 60. However, this holding step 75 varies its duration from a maximum duration on the first row waveform 252 to zero duration on the last row waveform 272. The total writing step 90 includes the selection step 60 and the holding steps 65 and 75. During the writing step 90, the rows are sequentially selected and written one row at a time, and the selection step 60 sweeps from the first row to the final row. In the holding steps 65 and 75, voltages are applied to the row and column electrodes to establish a holding pixel voltage. After the post-selection step 70 is over, the pixel voltage (Vp1, Vp2, or Vpn) is set to zero or near zero.

Figure 5A:
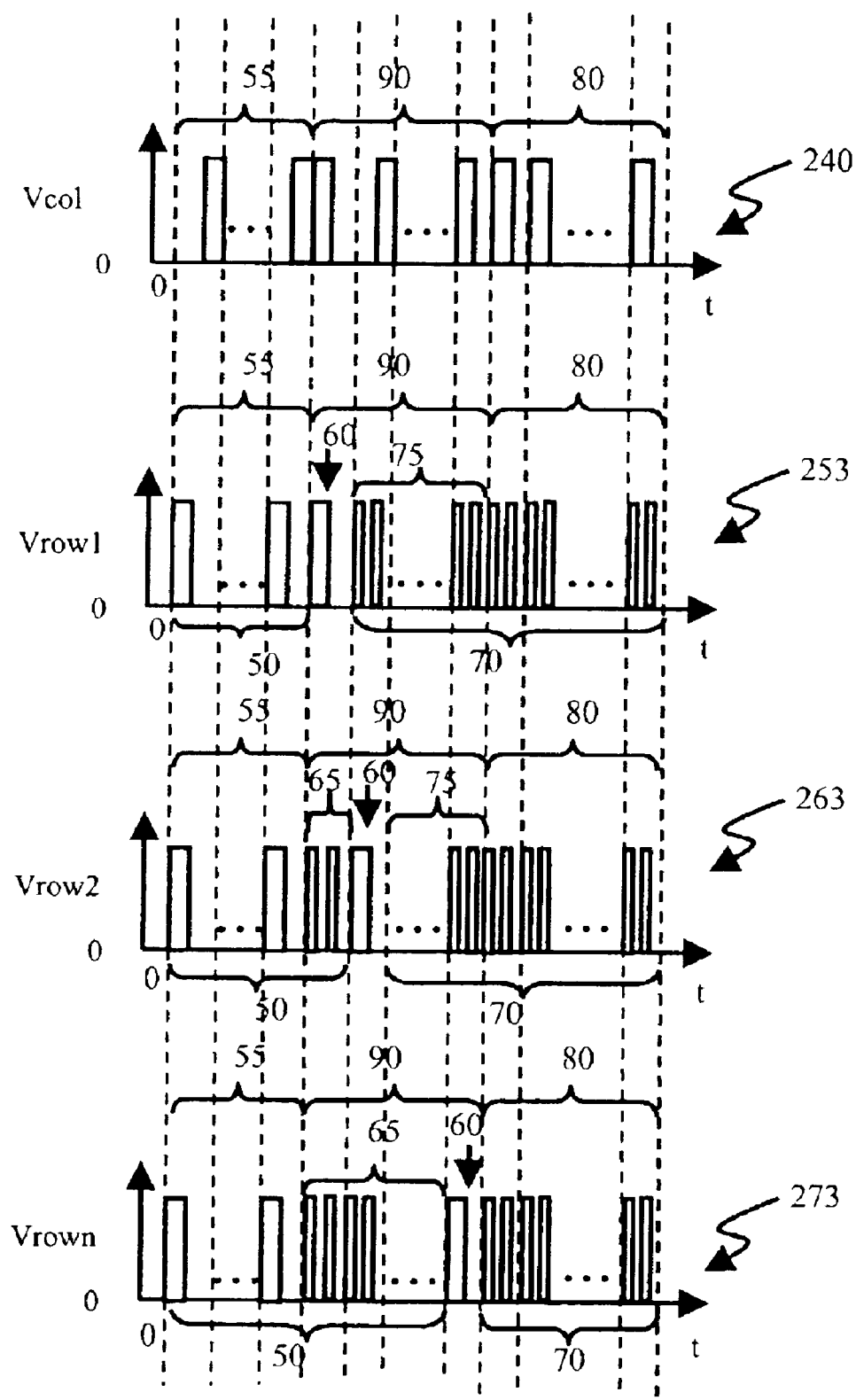
FIGS. 5A, 5B and 5C are graphs showing column and row voltage waveforms, pixel voltage waveforms, and RMS pixel voltage waveforms in accordance with one embodiment of the present invention.
Figure 5B:
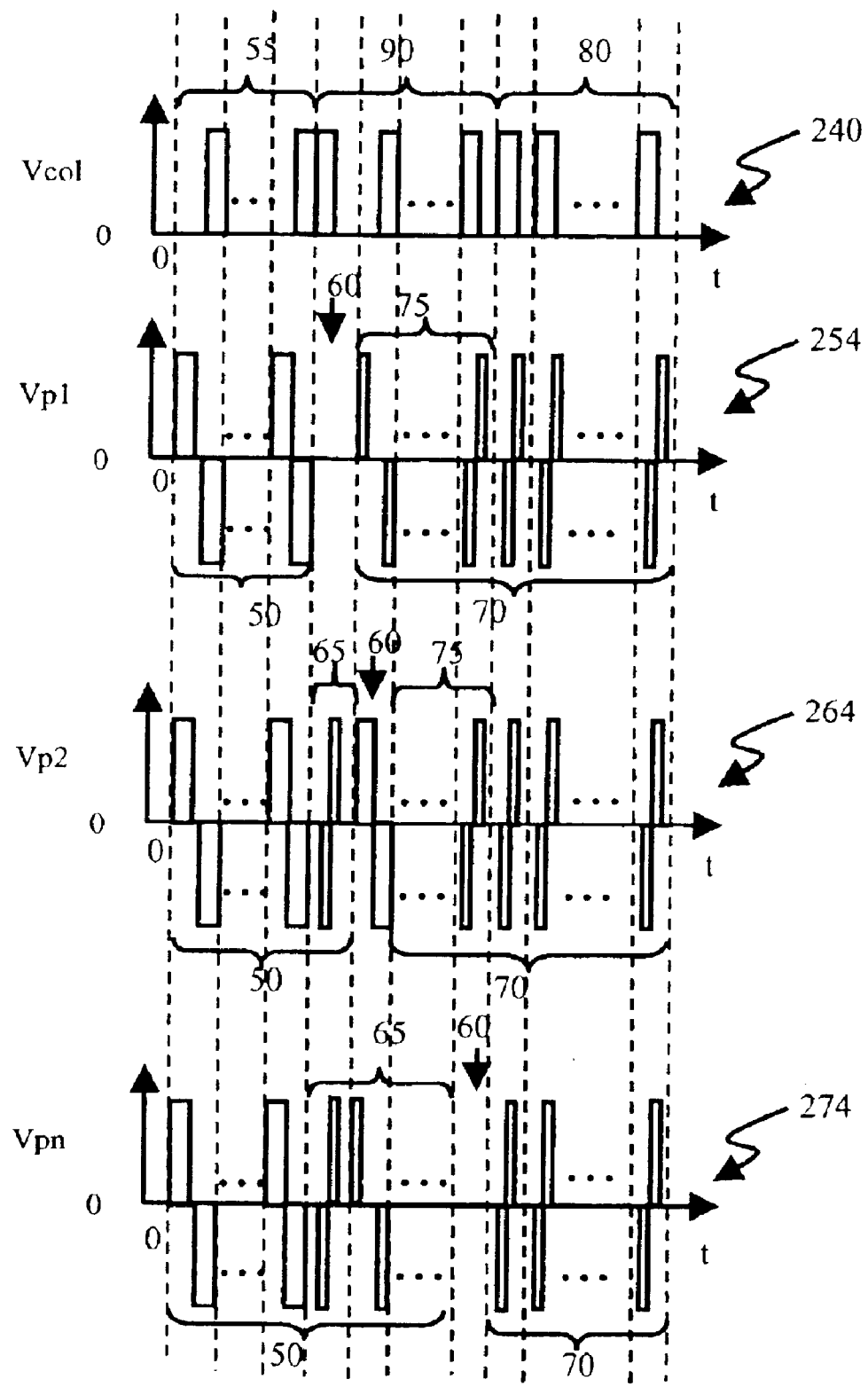
Figure 5C:
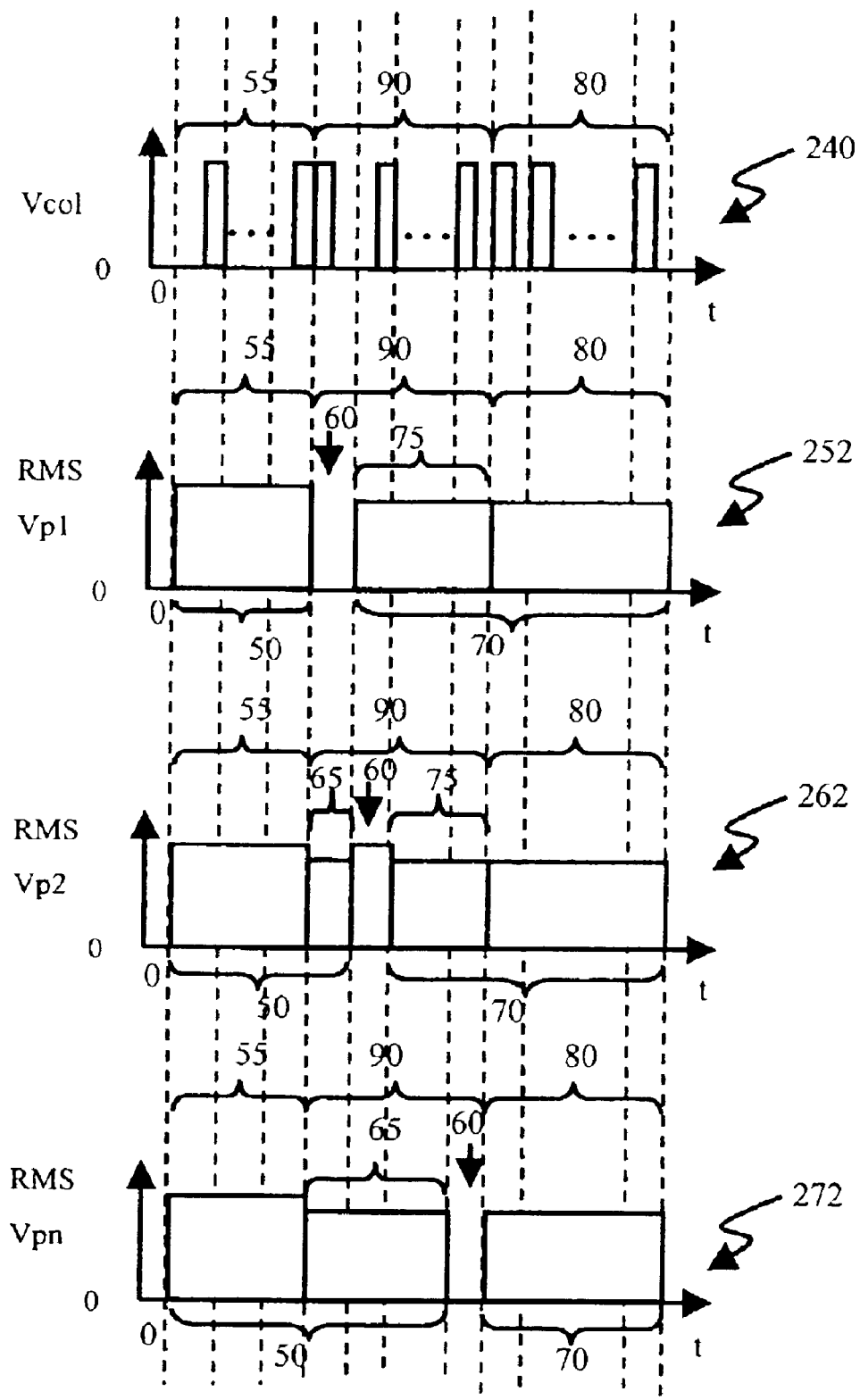

The RMS pixel voltage waveforms 252, 262, 272 can be implemented by applying row voltage waveforms Vrow1 253 on the first row, Vrow2 263 on the second row, Vrown 273 on the last row and a column voltage waveform Vcol 240 referring to FIG. 5A. The corresponding pixel voltage waveforms are shown as Vp1 254 on the first row, Vp2 264 on the second row, Vpn 274 on the last row in FIG. 5B. For the purpose of comparison, the column voltage waveform Vcol 240 is shown in FIGS. 5A, 5B and 5C. In this approach, all row and column voltage waveforms (253, 263, 273, 240) are unipolar. Furthermore, all row and column voltage waveforms have only 2 levels, a maximum amplitude U and a minimum amplitude. The minimum amplitude is actually zero in this embodiment. However, by adjusting the relative phase between the column and row voltage waveforms, bipolar waveforms including a zero level are achieved in the pixel voltage waveforms Vp1 254, Vp2 264, and Vpn 274. Also achieved are variations of the RMS pixel voltage in the pre-selection step 50, the selection step 60, and the post-selection step 70. The pixel voltages in the pre-selection step, the selection step, and the post-selection step thus are produced by unipolar voltage waveforms having the same amplitudes but different RMS voltage values produced by different duty cycles.

FIG. 5C shows one of the selection voltages is a maximum voltage (see waveform 262), and the other one is zero (see waveform 252) in the selection step 60. FIG. 5C also shows the RMS voltage amplitude in the pre-selection can be either larger than, smaller than, or equal to that in the selection step. Various ways of implementing a pre-selection step, a selection step, and a post-selection step have been disclosed in the commonly assigned U.S. Ser. No. 09/923, 659, filed Aug. 7, 2001 by Mi et al., the disclosure of which is incorporated herein by reference. As described by Mi et al., the post-selection step 70 can be made to have a constant duration by varying the duration of the post-common step 80. Using the drive scheme described in FIGS. 5A–C, the appearance of a migrating black bar noted above with respect to the prior art is reduced since the pre-selection step is relatively short and the liquid crystal is not necessarily in the homeotropic state.

Figure 6A:
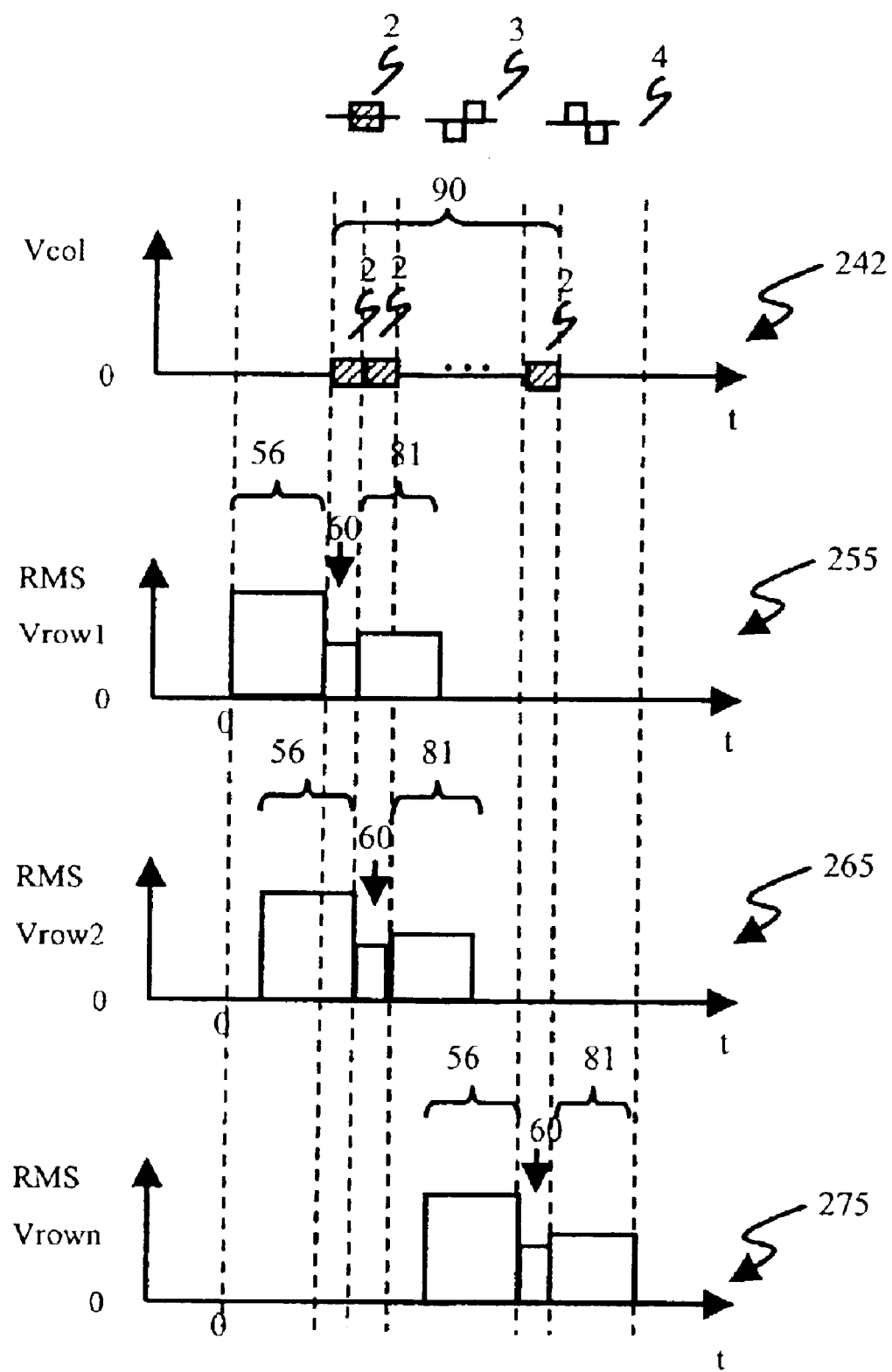
FIGS. 6A and 6B are graphs showing column voltage waveforms, RMS row voltage waveforms, and RMS pixel voltage waveforms in accordance with another embodiment of the present invention.
Figure 6B:
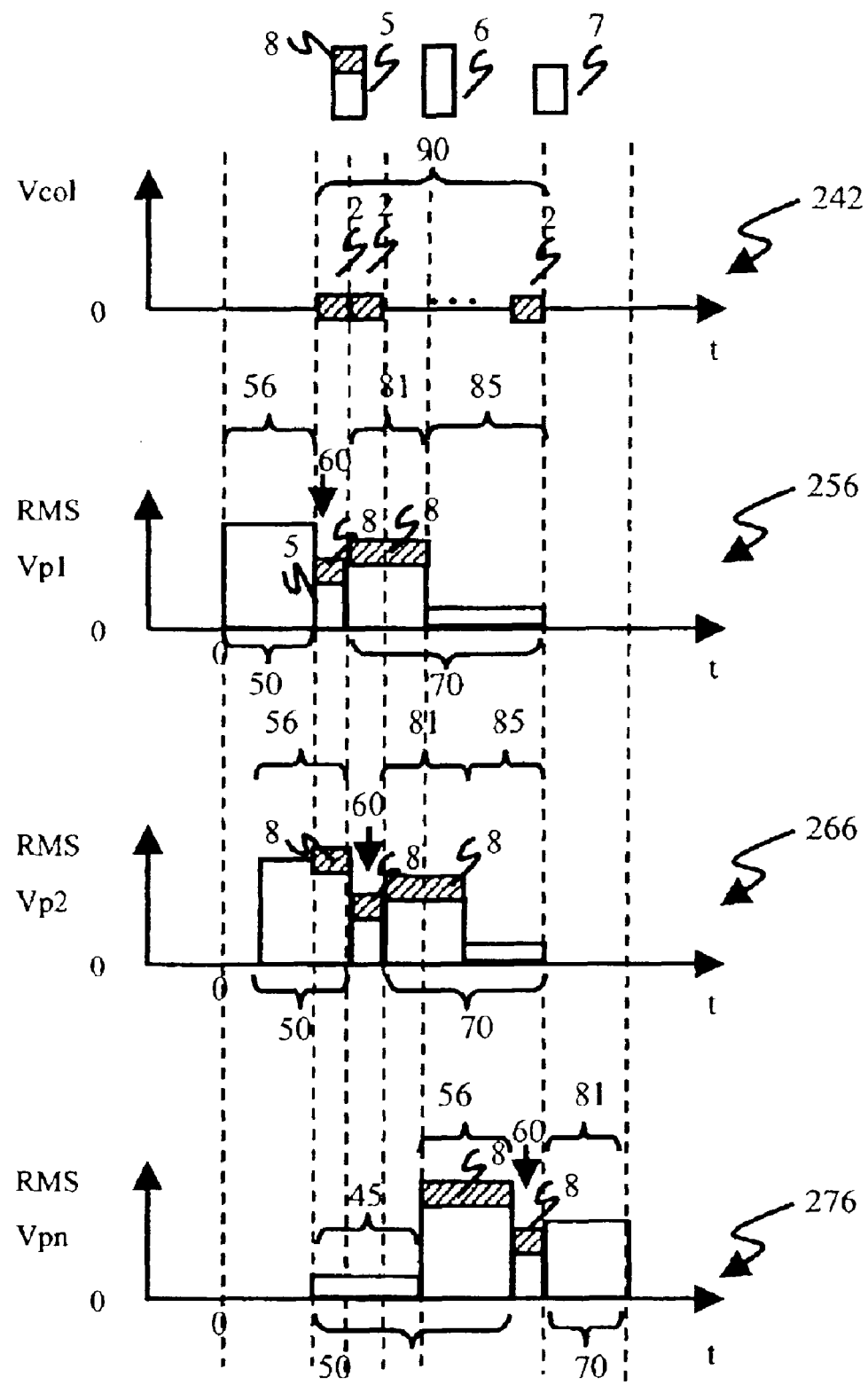

FIGS. 6A and 6B show another embodiment in accordance with the present invention. Referring to FIG. 6A, there are shown three RMS row voltage waveforms Vrow1 255, Vrow2 265, Vrown 275, representing waveforms on the first row, the second row, and the last row, respectively. All row voltage waveforms 255, 265, 275 have a pre-common step 56 prior to the selection step 60, and a post-common step 81 after the selection step 60. The pre-common step 56 and the post-common step 81 shift with time across rows. On the other hand, the pre-common step 55 and the post-common step 80 in FIGS. 5A, 5B and 5C are applied simultaneously without relative shifting. The column voltage waveform Vcol 242 is applied to the column electrode and consists of a series of bipolar voltage pulses 2 representing image data. The shaded voltage pulse 2 can be a voltage pulse 3 or voltage pulse 4, each having the same RMS voltage. The voltage pulses 3 and 4 are out of phase relative to each other, and are either in phase or out of phase relative to the voltage pulse in the selection step 60 of the row voltage waveforms. According to this embodiment, the pre-selection, selection, and post selection pixel voltages are formed from bipolar row and column voltage pulses.

FIG. 6B shows RMS pixel voltage waveforms Vp1 256, Vp2 266, Vpn 276 across the first row, the second row, and the last row, respectively. They are the difference between the row voltage waveforms Vrow1 255, Vrow2 265, Vrown 275 and the column voltage waveform Vcol 242, respectively. The shaded areas 8 in the pre-common step 56, the selection step 60, and the post-common step 81 indicate that the RMS voltage may vary from a higher level to a lower level depending on whether the voltage pulse in the row voltage waveform is in phase or out of phase relative to the voltage pulse 2 in the column voltage waveform Vcol 242. Take the voltage pulse 5 in the selection step 60 of the RMS pixel voltage waveform Vp1 256 as an example. When the voltage pulse on the row voltage waveform Vrow1 255 is out of phase relative to the column voltage pulse 2, the pixel voltage pulse 5 becomes the voltage pulse 6, bigger than the voltage pulse 7, which is the resultant pixel voltage pulse when they are in phase.

Still referring to FIG. 6B, all of the pixel voltage waveforms 256, 266, 276 have a pre-common step 56 in the pre-selection step 50. However, in the pre-common step 56, a pre-common voltage Vpre-c is not applied to all rows simultaneously, but sequentially shifted from the first row to the last row. The pre-selection step 50 further comprises a holding step 45 in the beginning. This holding step 45 increases its duration from 0 on the first row pixel voltage waveform Vp1 256 to a maximum duration on the last row pixel voltage waveform Vpn 276. All of the waveforms 256, 266, 276 have a post-common step 81 in the post-selection step 70. Just like the pre-common step 56, the post-common step 81 also moves sequentially from the first row to the last row. The post-selection step 70 further comprises a holding step 85 at the end. This holding step 85 decreases its duration from a maximum duration on the first row pixel voltage waveform Vp1 256 to a zero duration on the last row pixel voltage waveform Vpn 276. The total writing step 90 again includes the duration from the first row being written to the last row being written.

Circuits and systems for generating pulse trains to drive cholesteric liquid crystal displays are well known. Examples are found in U.S. Pat. No. 6,154,190, referenced above, and U.S. Pat. No. 6,268,840, issued Jul. 31, 2001 to Huang, and their entire disclosures are incorporated herein. The reference patents provide row and column drivers that provide pulse trains with different voltage levels to the rows or columns depending upon the step of the display operation. In contrast, examples found in the commonly assigned U.S. Ser. No. 09/923,659, referenced above, uses pulse trains with only 2-levels: U or 0. In a preferred embodiment a voltage source 100 generates a voltage U.

Figure 7:
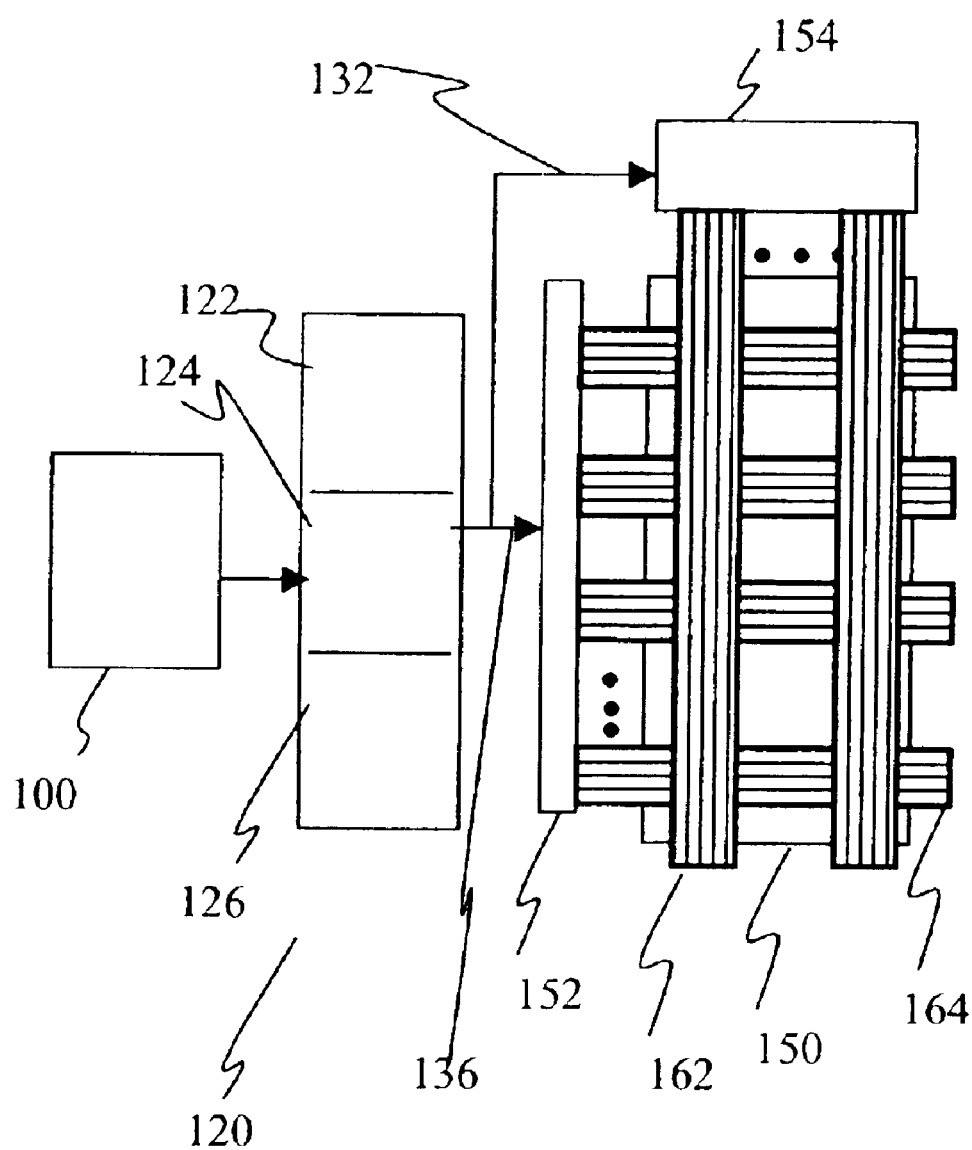
FIG. 7 is a schematic block diagram of an LCD display system and the control electronics for performing the invention.

FIG. 7 shows one example of a display system with control electronics 120 that has a voltage source 100 that generates a voltage at a maximum voltage U. The output voltage U is coupled to a duty cycle controller 122 that generates pulses or voltage signals, a phase controller 124 that sets the relative phase of a train of row output pulses with respect to the column pulse train, and a frequency controller 126 that sets the period of the output pulses. The period may be the same for both sets of pulses or different. The output pulses include column pulses 132 and row pulses 136. The display 150 receives the respective pulses in the column driver 154 and the row driver 152. The drivers apply the pulses to the column electrodes and row electrodes 162, 164 of the display. The individual controllers 122, 124, and 126 may be separated into two sets of controllers, one set for the rows and one set for the columns.

EXAMPLE

A display with 15 rows and 1 column was driven with a drive scheme as discussed above referring to FIGS. 5A, 5B and 5C. All row and column electrodes were applied with 2-level unipolar waveforms. The maximum voltage level was 120 volts, and the minimum level was 0. The pixel voltages in the pre-selection step, the selection step, and the post-selection step formed by the row and column waveforms were bipolar or zero with different duty cycles. In the selection step, the RMS value of the selection voltage was either 120V or 0V for selecting one of the final reflective states. The duration of the selection step was 0.6 ms (less than 1 ms per row). In the pre-common step 55 of the pre-selection step, the duration was 10 ms with 100% duty cycle, resulting in an RMS value of 120 V. The frequency of this step was 1 Khz. In the post-common step 80, the duration was 6 ms with an RMS value of 84.9 V, which is preferred to be about 65%–85% of the maximum selection voltage 120 volts. The frequency of the post-common step was 1.667 Khz. In the holding step 65, 75, the RMS value was 84.9V with a frequency of 1.667 Khz, which was different from the frequency of 1 Khz in the pre-selection step. The contrast was about 5 and the reflective state had a reflectance of about 20% at the peak wavelength of 540 nm. Although the RMS value of the pre-selection voltage was equal to the amplitude of the bipolar waveform in this example, it can be larger than or less than the amplitude of the maximum selection voltage, which can vary from 0 to 120 volts.

It is known that for any given cholesteric liquid crystal display with a fixed number of rows, the drive parameters including but not limited to the voltage level U, RMS voltage level, period (or frequency), and number of cycle, are adjustable for optimized contrast and brightness. Thus the above example does not necessarily represent the best operation of the display. The high voltage (about 120 volts) required for the exemplary display is due to low percentage of liquid crystal material in the gelatin binder, which advantageously is not pressure sensitive and can be manufactured in a roll-to-roll fashion. For a conventional cholesteric liquid crystal display having almost 100% liquid crystal, the drive voltage can be significantly lower.

The invention has been described in detail with particular reference to certain preferred embodiments thereof, but it will be understood that variations and modifications can be effected within the spirit and scope of the invention. For example, there are various options for the waveforms within the spirit of this invention.

PARTS LIST 2 voltage pulse
3 voltage pulse
4 voltage pulse
5 voltage pulse
6 voltage pulse
7 voltage pulse
8 voltage pulse
10 display
15 substrate
20 first patterned conductors
22 planar state
24 focal conic state
25 homeotropic state
26 incident light
27 transmitted light
28 reflected light
30 polymer dispersed cholesteric layer
40 second patterned conductors
45 holding step
50 pre-selection step
55 pre-common step
56 pre-common step
60 selection step
65 holding step
70 post-selection step
75 holding step
80 post-common step
81 post-common step
85 holding step
90 writing step
100 voltage source
120 control electronics
122 duty cycle controller
124 phase controller
126 frequency controller
132 column pulses
136 row pulses 150 display
152 row driver
154 column driver
162 column electrodes
164 row electrodes
220 pixel voltage waveforms
222 pixel voltage waveforms
240 column voltage waveform
242 column voltage waveform
252 RMS pixel voltage waveform on the first row
253 row voltage waveform on the first row
254 pixel voltage waveform on the first row
255 RMS row voltage waveform on the first row
256 RMS pixel voltage waveform on the first row
262 RMS pixel voltage waveform on the second row
263 row voltage waveform on the second row
264 pixel voltage waveform on the second row
265 RMS row voltage waveform on the second row
266 RMS pixel voltage waveform on the second row
272 RMS pixel voltage waveform on the last row
273 row voltage waveform on the last row
274 pixel voltage waveform on the last row
275 RMS row voltage waveform on the last row
276 RMS pixel voltage waveform on the last row
401 row voltage pulse on the first row
402 row voltage pulse on the second row
406 row voltage pulse on the last row
410 column voltage waveform
411 column voltage pulse in the period T1
412 column voltage pulse in the period T2
416 column voltage pulse in the period Tn
420 row voltage waveform on the first row
430 row voltage waveform on the second row
440 row voltage waveform on the last row
450 pre-selection step
451 pixel voltage waveform on the first row
452 RMS pixel voltage waveform on the first row
460 selection step
461 pixel voltage waveform on the second row
462 RMS pixel voltage waveform on the second row
470 post-selection step
471 pixel voltage waveform on the last row
472 RMS pixel voltage waveform on the last row
t time
Tc critical time duration
Tc2 critical time duration
T1 first period of writing
T2 second period of writing
Tn last period of writing
Tpre duration of pre-selection step
U maximum voltage
$V_{row1}$ row voltage waveform on the first row
$V_{row2}$ row voltage waveform on the second row
$V_{rown}$ row voltage waveform on the last row
$V_{col}$ column voltage waveform
$V_{p1}$ pixel voltage waveform on the first row
$V_{p2}$ pixel voltage waveform on the second row
$V_{pn}$ pixel voltage waveform on the last row
$V_{col}$ column voltage waveform
$V_1$ voltage below which states of cholesteric liquid crystals do not change state
$V_2$ voltage at which cholesteric liquid crystals are switched into focal state
$V_3$ voltage at which cholesteric liquid crystals are switched into focal state
$V_4$ voltage above which cholesteric liquid crystals are switched into planar state after the voltage is turned off quickly
$V_5$, $V_6$ voltages at which cholesteric liquid crystals are switched into different states
Vsrow row voltage on selected rows
Vpre-c voltage in the pre-common step 55
Vpost-c voltage in the post-common step 80

What is claimed is:

1. A method for writing pixels in a cholesteric liquid crystal display having opposing rows and columns of electrodes and cholesteric liquid crystal material disposed between the rows and columns of electrodes to define an array of pixels, the cholesteric liquid crystals having a plurality of reflective states stable in the absence of an electrical field, one state having a minimum reflection, and another state with maximum reflection, comprising the steps of:

a) in a pre-selection step, applying voltages to the row and column electrodes to establish a pre-selection pixel voltage having a magnitude and duration effective to change at least one possible reflective state, but ineffective to drive the liquid crystal material to a common state;

b) in a selection step, applying voltages to the row and column electrodes to establish a selection pixel voltage for selecting a final reflective state for the pixel; and c) in a post-selection step, applying voltages to the row and column electrodes to establish a post selection pixel voltage for achieving a final desired reflective state.

2. The method of claim 1, wherein a pixel voltage is zero after the post-selection step.

3. The method of claim 1, further comprising in a holding step in the pre-selection step, applying voltages to the row and column electrodes to establish a holding pixel voltage.

4. The method of claim 1, further comprising in a holding step in the post-selection step, applying voltages to the row and column electrodes to establish a holding pixel voltage.

5. The method of claim 3, wherein the holding step is at the end of the post-selection step.

6. The method of claim 4, wherein the holding step is in the beginning of the pre-selection step.

7. The method of claim 1, wherein as a result of the pre-selection step the liquid crystal material is left in a dynamic process.

8. The method of claim 7, wherein the dynamic process is an evolution from a planar state to a homeotropic state.

9. The method of claim 7, wherein the dynamic process is an evolution from a focal conic state to a homeotropic state.

10. The method of claim 7, wherein the dynamic process is an evolution from a focal conic state to a planar state.

11. The method of claim 7, wherein the dynamic process is an evolution from a planar state to a focal conic state.

12. The method of claim 1, wherein at least two of the pre-selection, selection, and post selection pixel voltages have different maximum amplitudes.

13. The method of claim 1, wherein the pre-selection, selection, and post selection pixel voltages have the same amplitudes but different RMS voltage values and are produced by unipolar row and column voltage waveforms.

14. The method of claim 13, wherein the pre-selection pixel voltage is a bipolar waveform with 100% duty cycle.

15. The method of claim 13, wherein a maximum selection pixel voltage has an RMS value equal to the amplitude.

16. The method of claim 13, wherein the RMS value of the post selection voltage is less than the amplitude.

17. The method of claim 13, wherein the RMS value of the pre-selection voltage is less than the amplitude.

18. The method of claim 13, wherein the RMS value of the pre-selection voltage is larger than that of a maximum selection voltage.

19. The method of claim 13, wherein the RMS value of the post-selection voltage is 65%~85% of a maximum selection voltage.

20. The method of claim 1, wherein the pre-selection, selection, and post selection pixel voltages have bipolar waveforms.

21. The method of claim 1, wherein at least one selection voltage is zero volts.

22. The method of claim 1, wherein the pre-selection, selection, and post selection pixel voltages are formed from bipolar row and column voltage pulses.

23. The method of claim 1, wherein the pre-selection, selection, and post selection pixel voltages are formed from row and column voltage pulses, of which at least one is unipolar.

24. The method of claim 23, wherein the unipolar voltage has two voltage levels.

25. The method of claim 1, wherein the duration of the selection voltage is less than 1 ms.

26. The method of claim 1, wherein at least two of the pre-selection, selection, and post selection pixel voltages are formed by waveforms having different frequencies.

27. A cholesteric liquid crystal display apparatus, comprising:
a) a matrix of electrodes arranged in rows and in columns, the regions between overlapping row and column electrodes defining pixels in the display;
b) a cholesteric liquid crystal material disposed between the rows and columns for assuming a plurality of gray level states that are stable in the absence of an electric field in response to the selective application of voltage signals to the rows and columns; and
c) control electronics for generating row and column voltages including:
i) a pre-selection pixel voltage having a magnitude and duration effective to change at least one possible reflective state, but ineffective to drive the liquid crystal material to a common state;
ii) a selection pixel voltage for selecting a final reflective state for the pixel; and
iii) a post selection pixel voltage for achieving a final desired reflective state.

28. The apparatus of claim 27, wherein the control electronics causes a pixel voltage to be zero after the post-selection voltage.

29. The apparatus of claim 27, wherein the control electronics further generates row and column voltages for achieving a holding pixel voltage prior to the pre-selection voltage.

30. The apparatus of claim 27, wherein the control electronics further generates row and column voltages for achieving a holding pixel voltage between the pre-selection voltage and the selection voltage.

31. The apparatus of claim 27, wherein the control electronics further generates row and column voltages for achieving a holding pixel voltage between the post-selection voltage and the selection voltage.

32. The apparatus of claim 27, wherein the control electronics further generates row and column voltages for achieving a holding voltage after the post-selection voltage.

33. The apparatus of claim 27, wherein as a result of the pre-selection voltage, the liquid crystal material is left in a dynamic process.

34. The apparatus of claim 33, wherein the dynamic process is an evolution from a planar state to a homeotropic state.

35. The apparatus of claim 33, wherein the dynamic process is an evolution from a focal conic state to a homeotropic state.

36. The apparatus of claim 33, wherein the dynamic process is an evolution from a focal conic state to a planar state.

37. The apparatus of claim 33, wherein the dynamic process is an evolution from a planar state to a focal conic state.

38. The apparatus of claim 27, wherein at least two of the pre-selection, selection, and post selection pixel voltages have different maximum amplitudes.

39. The apparatus of claim 27, wherein the pre-selection, selection, and post selection pixel voltages have bipolar waveforms.

40. The apparatus of claim 27, wherein at least one selection voltage is zero volts.

41. The apparatus of claim 27, wherein the pre-selection, selection, and post selection pixel voltages are formed from bipolar row and column voltage pulses.

42. The apparatus of claim 27, wherein the duration of the selection voltage is less than 1 ms.

43. The apparatus of claim 27, wherein the pre-selection, selection, and post selection pixel voltages are formed from row and column voltage pulses, of which at least one is unipolar.

44. The apparatus of claim 43, wherein the unipolar voltage has two voltage levels.

45. The apparatus of claim 27, wherein the pre-selection, selection, and post selection pixel voltages have the same amplitudes but different RMS voltage values and are produced by unipolar row and column voltage waveforms.

46. The apparatus of claim 45, wherein the pre-selection pixel voltage is a bipolar waveform with 100% duty cycle.

47. The apparatus of claim 45, wherein a maximum selection pixel voltage has an RMS value equal to the amplitude.

48. The apparatus of claim 45, wherein the RMS value of the post selection voltage is less than the amplitude.

49. The apparatus of claim 45, wherein the RMS value of the pre-selection voltage is less than the amplitude.

50. The apparatus of claim 45, wherein the RMS value of the pre-selection voltage is larger than that of a maximum selection voltage.

51. The apparatus of claim 45, wherein the RMS value of the post-selection voltage is 65% ~85% of a maximum selection voltage.

52. The apparatus of claim 27, wherein at least two of the pre-selection, selection, and post selection pixel voltages are formed by waveforms having different frequencies.

* * * * *